No. 793,861. PATENTED JULY 4, 1905.
H. TSCHERNING.
MOLDING MACHINE.
APPLICATION FILED SEPT. 5, 1903.

5 SHEETS—SHEET 1.

Witnesses:
S. Bliss
Russell Wile

Inventor:
Harry Tscherning
by H Bitner
Atty.

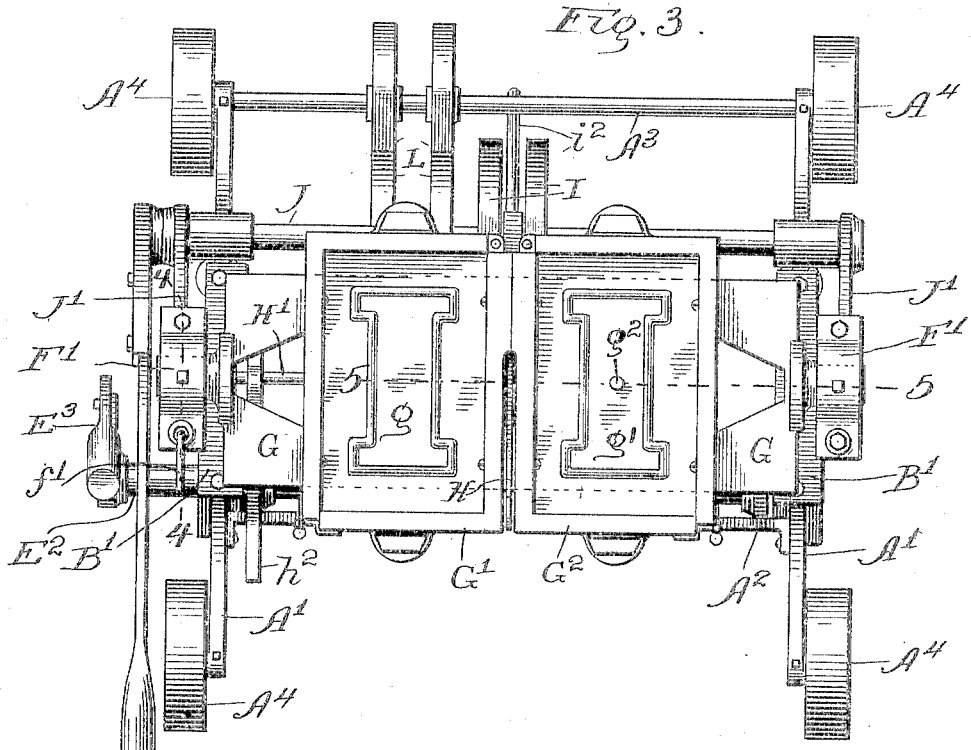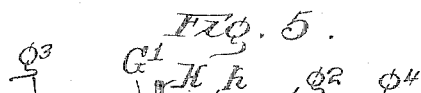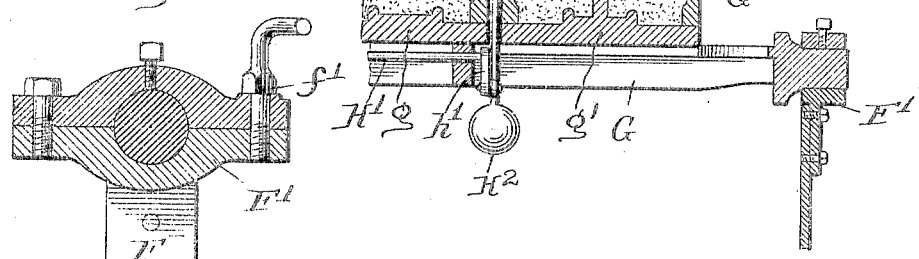

No. 793,861. PATENTED JULY 4, 1905.
H. TSCHERNING.
MOLDING MACHINE.
APPLICATION FILED SEPT. 5, 1903.

5 SHEETS—SHEET 3.

Witnesses:
S. Bliss
Russell Wiles

Inventor:
Henry Tscherning,
by H. Bitner,
Atty.

No. 793,861. PATENTED JULY 4, 1905.
H. TSCHERNING.
MOLDING MACHINE.
APPLICATION FILED SEPT. 5, 1903.

5 SHEETS—SHEET 4.

Witnesses:
S. Bliss
Russell Wiles

Inventor:
Henry Tscherning
by H. Bitner
Atty.

No. 793,861. PATENTED JULY 4, 1905.
H. TSCHERNING.
MOLDING MACHINE.
APPLICATION FILED SEPT. 5, 1903.
5 SHEETS—SHEET 5.
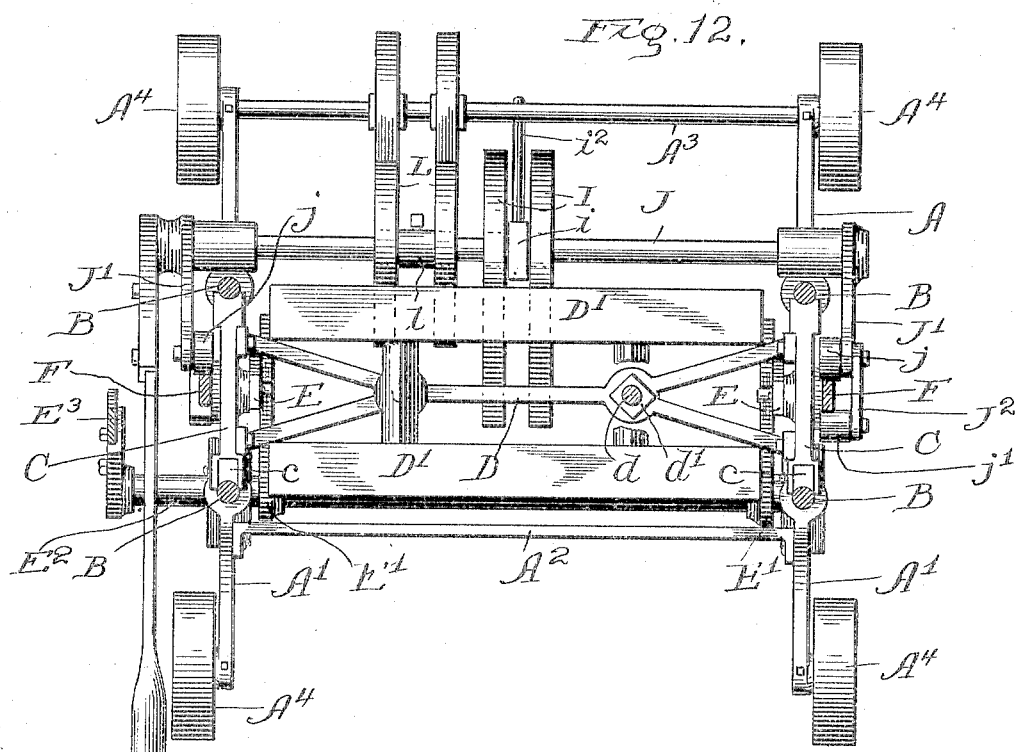
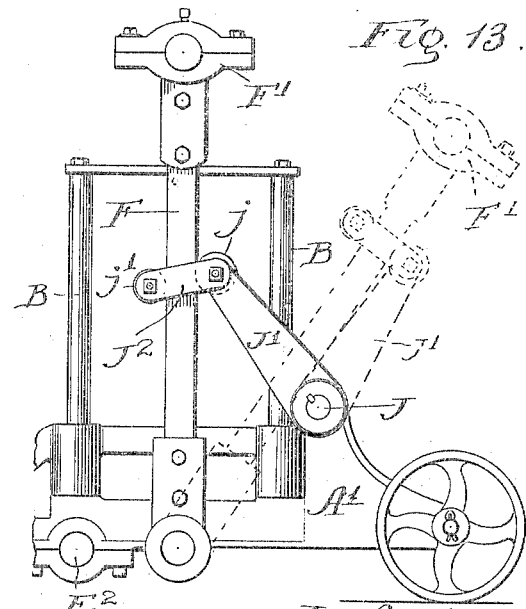
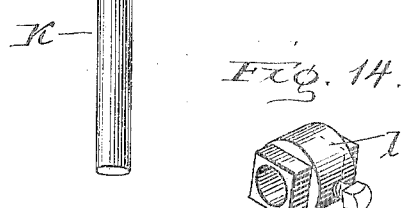
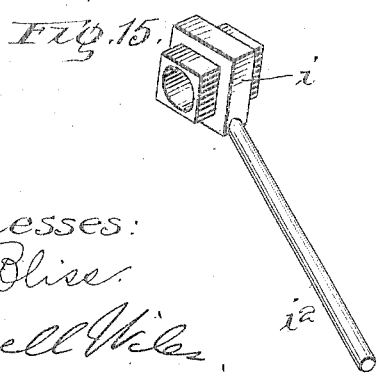
Witnesses:
S. Bliss.
Russell Wiles.
Inventor:
Henry Tscherning
by H. Bitner
Atty.

No. 793,861.

Patented July 4, 1905.

UNITED STATES PATENT OFFICE.

HENRY TSCHERNING, OF FREEPORT, ILLINOIS, ASSIGNOR TO ARCADE MANUFACTURING COMPANY, OF FREEPORT, ILLINOIS, A CORPORATION OF ILLINOIS.

MOLDING-MACHINE.

SPECIFICATION forming part of Letters Patent No. 793,861, dated July 4, 1905.

Application filed September 5, 1903. Serial No. 172,100.

*To all whom it may concern:*

Be it known that I, HENRY TSCHERNING, a citizen of the United States of America, residing at Freeport, in the county of Stephenson and State of Illinois, have invented certain new and useful Improvements in Molding-Machines, of which the following is a specification.

My invention relates to certain new and useful improvements in molding-machines; and its object is to produce a device of this class which shall be strong, simple, and efficient in operation.

To this end my invention consists in certain novel features of construction, which are clearly illustrated in the accompanying drawings and described in this specification.

Figure 1:
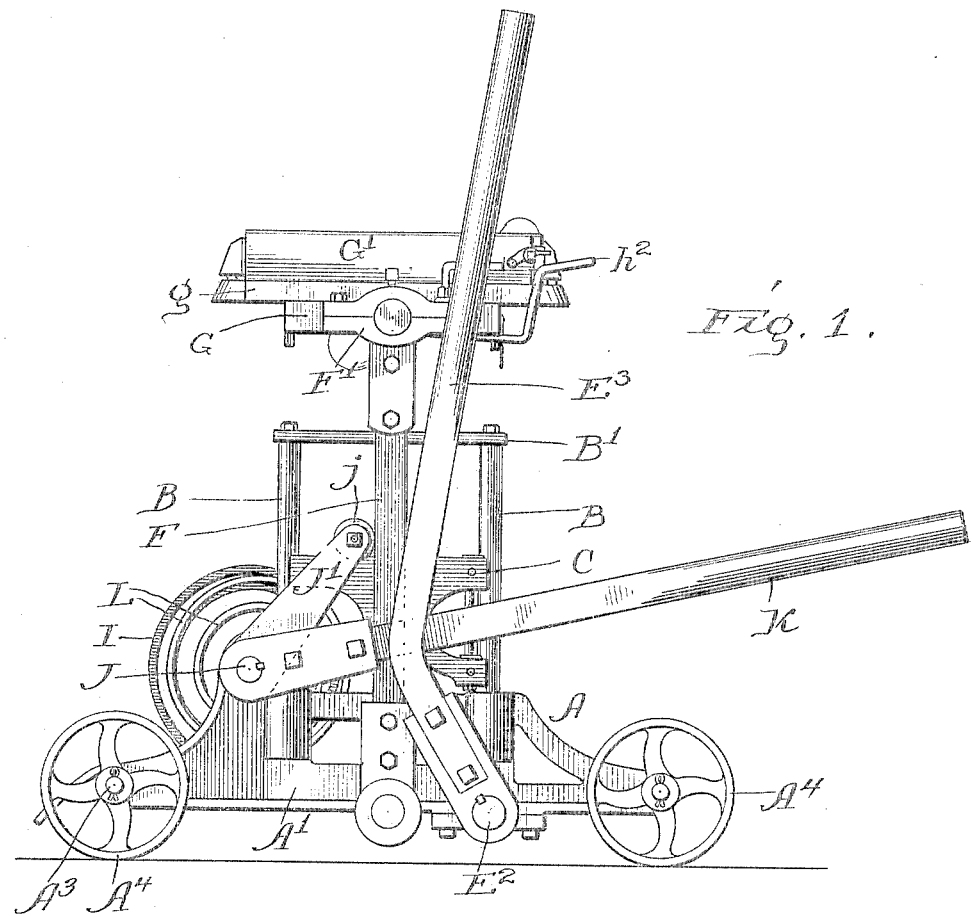
Figure 2:
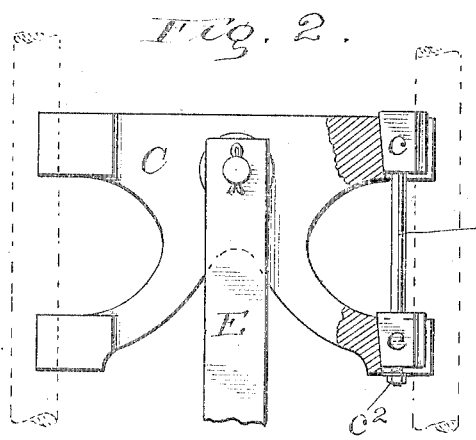
Figure 6:
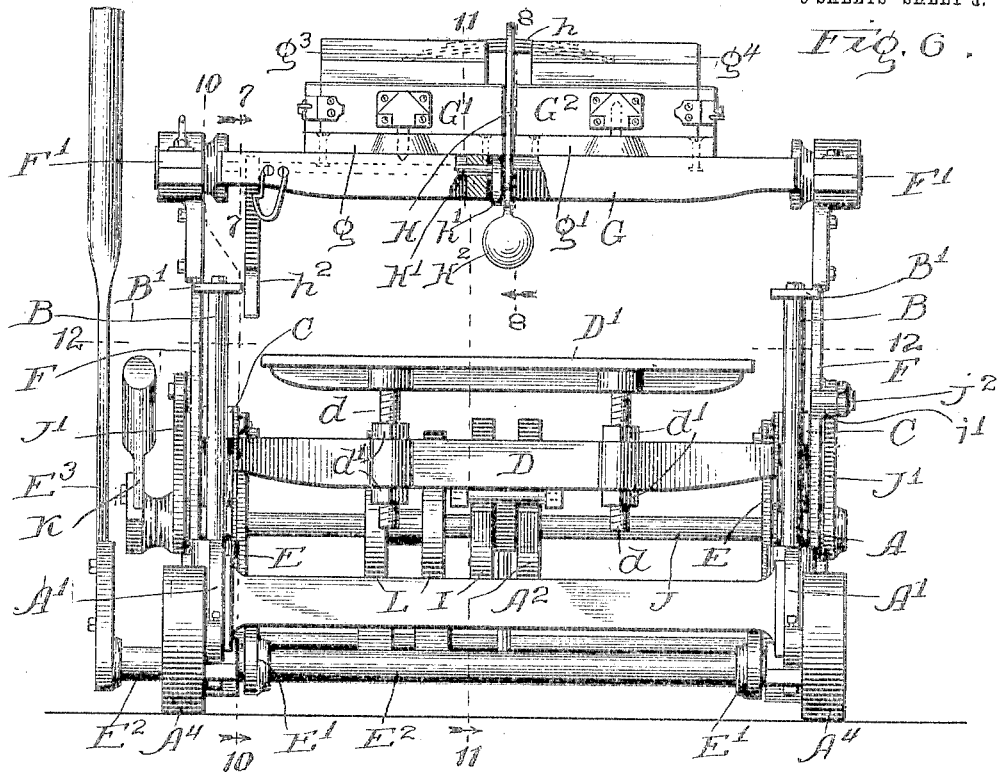
Figure 7:
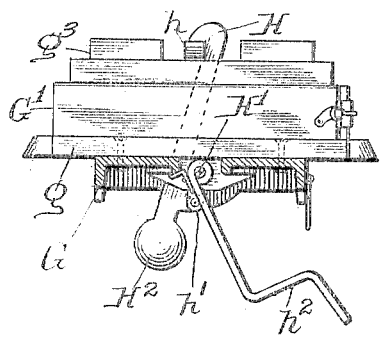
Figure 8:
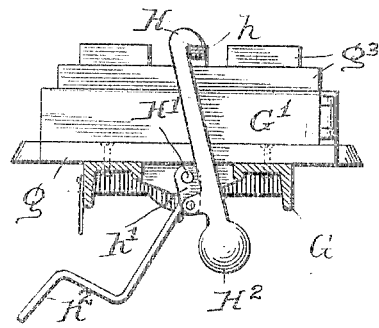
Figure 9:
Figure 10:
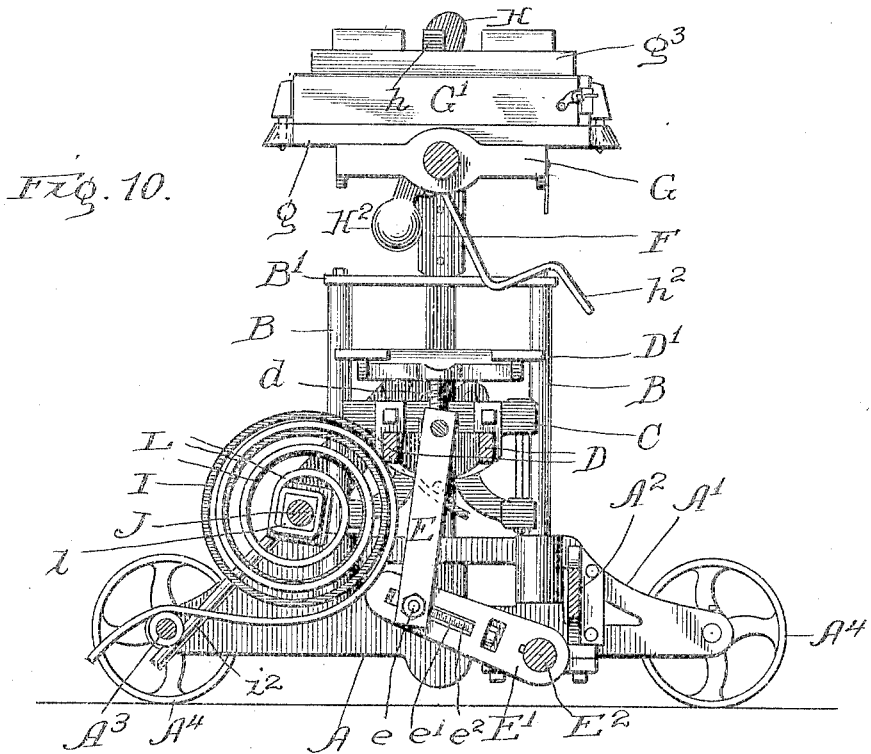
Figure 11:
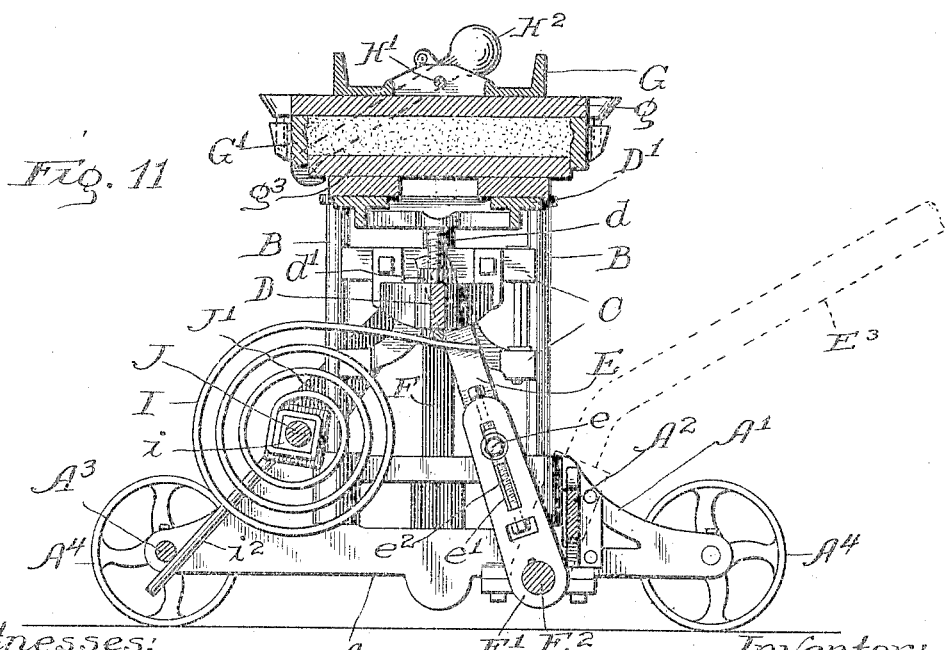

In the drawings, Figure 1 is a side view of the machine. Fig. 2 is a detail side view of one of the cross-heads, partly broken away to show certain parts which would otherwise be hidden from view. Fig. 3 is a plan view. Fig. 4 is a detail vertical section of a bearing-box and adjacent parts, the line of section being indicated at 4 4 in Fig. 3. Fig. 5 is a vertical section of the head, showing the molds in place thereon, the line of section being indicated at line 5 5 of Fig. 3. Fig. 6 is a front view of the machine with the molds in place, a portion of the head being broken out to illustrate the parts which would otherwise be hidden. Fig. 7 is a vertical cross-section through the head, the line of section being indicated at 7 7 in Fig. 6. Fig. 8 is a similar section in the line 8 8 of Fig. 6. Fig. 9 is a plan view of one of the cross-bars which forms a part of the frame of the machine. Fig. 10 is a view, partly in side elevation and partly in vertical cross-section, the line of section being indicated at 10 10 in Fig. 6. Fig. 11 is a similar view in the line 11 11 of Fig. 6, but showing the head inverted and the lower table raised to compress the sand in the mold. Fig. 12 is a view, partly in plan and partly in horizontal section, the line of section being indicated at 12 12 in Fig. 6. Fig. 13 is a side view of the frame of the machine, one of the arms supporting the head, and part of the mechanism for oscillating said arm, the view being taken in a direction opposite to that seen in Fig. 1. Fig. 14 is a perspective view of a block upon which springs for counterbalancing the head are wound. Fig. 15 is a perspective view of a block upon which the springs for counterbalancing the weight of the platform are wound.

Referring to the drawings, A is a suitable base composed of side pieces A', connected by a transverse bar $A^2$ and a rod $A^3$. Wheels $A^4$ are provided at the front and rear of the base, upon which the machine rests and upon which it is readily movable from place to place. Upon each of the side pieces of the base are two vertical rods B, connected together and spaced apart at the upper ends by cross-pieces B'. Each pair of vertical rods B forms a vertical guideway, in which runs a cross-head C which is reciprocable therein. Each cross-head is bifurcated at its front and rear ends to run upon the rods, the groove formed by such furcations being deeper at the front than at the rear. In the grooves at the front of such cross-head are two beveled wedges c, Fig. 2, engaging with corresponding beveled portions in the cross-heads, the wedges being connected together by a bolt c', which is provided with a nut $c^2$ at its lower end, engaging the fork in the cross-head, whereby the wedges can be moved with respect to the cross-head. It will be seen that this arrangement forms a simple and efficient means for adjusting the width of the cross-head to make it conform to any irregularity in the spaces between the rods B which may arise from wear in use.

The two cross-heads C are connected by a transverse bar or strut D, (see Figs. 6 and 12,) through which extend two screws d, having nuts d' above and below the transverse bar D, by which they can be adjusted and locked in any desired position. The upper ends of the screws d support a table or platform D'. Each cross-head C has pivoted to it a link E, (see Fig. 10,) which is provided at its opposite end with a bolt e, extending through a slot e' in an arm E', keyed against rotation upon a rock-shaft $E^2$, journaled in the sides A' of the frame. Adjusting-screws $e^2$ are provided, by which the position of the bolt $e$ in the slot $e'$ can be varied to make the effective length of the arms E′ greater or less, as the case may be. The rock-shaft $E^2$, which is journaled in the base of the machine near its forward end, is provided with a hand-lever $E^3$, (see Fig. 1,) by which it may be rocked. Such rocking of the shaft caused by the forward movement of the hand-lever $E^3$ will swing the arms E′ from the position shown in Fig. 10 to the position shown in Fig. 11, thereby forcing the cross-heads and the platform carried thereby upward, as indicated.

To the base of the machine near its center are pivoted upon outwardly-projecting gudgeons two upwardly-extending arms F, bearing at their upper ends journal-boxes F′. In said journal-boxes is journaled a head G, the gudgeons upon the ends thereof entering the journal-boxes. One of the journal-boxes F′, Fig. 4, is provided with a screw $f'$, having a suitable handle by which the head G can be locked in any desirable position. The head consists of a suitable frame, upon one side of which are secured two match-plates, (see Figs. 5 and 6,) each of which has upon it in relief one half the pattern which is to form the completed mold. These match-plates are indicated in the drawings by $g$ $g'$, the plate $g$ forming the mold in the drag and the plate $g'$ the mold in the cope. The plate $g'$ is provided with a sprue $g^2$, which coöperates with a telescoping bead upon the board which covers that part of the flask, as set forth and claimed in my application on molding-machine, filed on even date herewith, September 5, 1903, and allotted Serial No. 172,099.

In the use of this device the drag G′ and cope $G^2$ of the flask are placed upon the match-plates $g$ $g'$ with the head in the position shown in Fig. 10. The drag and cope are then filled with sand and boards $g^3$ $g^4$ (see Fig. 6) are placed upon the two halves of the flask and clamped thereon, as illustrated. The head is then inverted and pressure brought to bear upon the boards. In order to hold the two parts of the flask, together with their contents and the boards which cover them, in position as the head is turned over, some clamping device must be provided. To effect this clamping, a spring $h$, Fig. 5, is placed across the two boards $g^3$ $g^4$, and a hook H is hooked over this spring. The hook H is pivoted and swings loose upon a radial arm $h'$, rigidly secured to a rock-shaft H′, to which is fastened a handle $h^2$. After the hook is hooked over the spring the lever $h^2$ is moved from the position shown in Fig. 1 to the position shown in Fig. 10, thereby moving the point of support of the hook H downward and bringing it into firm clamping-contact with the spring $h$. In this position the pivotal point of the hook upon the arm $h'$ has swung past the dead-center—that is, the line between the spring and the pivot of the shaft H′—and the parts are locked in position, so that the head can be inverted without danger of the parts of the flask falling out of place. After the head has been inverted the hand-lever $E^3$ is swung forward, raising the table D′ into contact with the boards $g^3$ $g^4$ and compressing the contents of the drag and cope. This releases the tension upon the spring, and inasmuch as the hook is now inverted a weight $H^2$ upon one end of the same swings it from its clamped position to the position shown in Fig. 11, the movement being about its pivot upon the end of the radial arm $h'$. The head is then tapped slightly and the table or plunger D′ is lowered. The drag and cope, with their contents, leave the head and follow the platform. A pair of springs I are wound upon a box $i$, which is loose upon a rock-shaft J at the rear of the machine. This box $i$ is prevented from rotation with respect to the frame of the machine by a rod $i^2$, which engages with the rod $A^3$ at the rear of the machine. The opposite ends of the spring I engage with the cross-bar D and tend to counterbalance the weight of the cross-heads and cross-bar and platform.

After the platform has been lowered, carrying with it the parts of the flask and their contents, the head G is swung from the position shown in solid lines in Fig. 13 to the position shown in dotted lines in order to render the molds easily accessible. This movement is accomplished by the following mechanism: Upon the rock-shaft J are arms J′, Fig. 13, which bear upon their ends rollers $j$. A link $J^2$ is pivoted to the end of one of the arms J′ and bears upon its end a roller $j'$. The two rollers $j$ $j'$ lie upon opposite sides of and engage with one of the upwardly-projecting arms F, which support the head. A hand-lever K, Fig. 1, is provided, by which the rock-shaft J can be rocked, and when so rocked the arms J′ will swing with the shaft, drawing the head backward or forward, as the case may be. Springs L, Fig. 10, are wound on a box $l$, which is rigidly secured to the rock-shaft J, the opposite ends of these springs engaging with the rod $A^3$, heretofore referred to. These springs tend to hold the head normally in the position shown in solid lines in Fig. 13.

The bars B′, which connect the vertically-projecting guide-rods B, are beveled at $b$, Fig. 9, and provided with stops $b'$, the purpose of this construction being to guide the arms F accurately to place in returning from their backward position and to provide a stop which will accurately position the head in its proper place.

The remainder of the operation of this device will now be readily apparent. After the plunger is lowered, carrying with it the parts of the flask, the head is swung back to the position shown in dotted lines in Fig. 13 to make the work accessible to the operator.

He then places the cope upon the drag and removes the flask, thereupon swinging the head back to its original position, the machine being then ready for another operation. This movable table is particularly desirable for the reason that the plunger can be raised after the head is swung back to afford a convenient work-bench for the operator. This is especially useful if cores are to be placed in the molds.

I realize that considerable variation is possible in the details of this construction without departing from the spirit of the invention, and I therefore do not intend to limit myself to the specific form herein shown and described.

I claim as new and desire to secure by Letters Patent—

1. In a device of the class described, the combination with a suitable base and a vertically-movable platform, of arms pivoted to the base, means for swinging them upon their pivots, and a head bearing a pattern-plate journaled in the ends of the arms.

2. In a device of the class described, the combination with a suitable base and a vertically-movable platform, of arms pivoted to the base, means for swinging them upon their pivots, a head bearing a pattern-plate journaled in the ends of the arms, means for guiding said arms during a portion of their swing, and stops for limiting the amount of their swing.

3. In a device of the class described, the combination with a suitable base and a vertically-movable platform, of arms pivoted to the base, means for swinging them upon their pivots, a head bearing a pattern-plate journaled in the ends of the arms, and means for holding the arms normally in a vertical position.

4. In a device of the class described, the combination with a suitable base, guides thereon, and a head supported above the same, of cross-heads running in the guides, a platform supported by the cross-heads, links connected to the cross-heads, a rock-shaft, means for rocking the shaft, and adjustable arms upon the rock-shaft pivoted to the ends of the links.

5. In a device of the class described, the combination with a suitable base and platform, of a rotatable head, a rock-shaft journaled in the head, means for rocking the shaft, a radial arm extending from the rock-shaft, a hook pivoted to said radial arm having a weight at one end, a spring adapted to lie across the top boards of the two halves of a flask and engaging with the hook when the flask is on the upper side of the head, the hook being clamped by the rotation of the rock-shaft, to bring the pivotal connection of the hook upon the spring and arm, beyond the dead-center of oscillation, and the weight upon the hook tending to swing it away from said spring when the head is inverted.

6. In a device of the class described, the combination with a suitable base and platform, of a rotatable head, a rock-shaft journaled in the head, means for rocking the shaft, a radial arm extending from the rock-shaft, a hook pivoted to said radial arm having a weight at one end, a cross-bar adapted to lie across the top boards of the two halves of a flask and engaging with the hook when the flask is on the upper side of the head, the hook being clamped by the rotation of the rock-shaft, to bring the pivotal connection of the hook upon the cross bar and arm, beyond the dead-center of oscillation, and the weight upon the hook tending to swing it away from said cross-bar when the head is inverted.

In witness whereof I have signed the above application for Letters Patent, at Freeport, in the county of Stephenson and State of Illinois, this 26th day of August, A. D. 1903.

HENRY TSCHERNING.

Witnesses:
F. E. BOEDIKER,
B. C. HERBIG.